United States Patent [19]

Marks

[11] 4,349,446
[45] Sep. 14, 1982

[54] GLAUBER'S SALT HEAT STORAGE COMPOSITIONS, CRYSTAL HABIT MODIFIERS

[75] Inventor: Stephen B. Marks, Wilmington, Del.
[73] Assignee: University of Delaware, Newark, Del.
[21] Appl. No.: 240,787
[22] Filed: Mar. 5, 1981
[51] Int. Cl.³ .............................................. C09K 3/18
[52] U.S. Cl. ...................................... 252/70; 252/71; 126/400; 126/900; 23/300
[58] Field of Search ..................... 252/67, 68, 69, 70, 252/71, 73, 74, 78.5, 76; 126/400, 900; 23/300

[56] References Cited

U.S. PATENT DOCUMENTS

| | | | |
|---|---|---|---|
| 2,677,664 | 5/1954 | Telkes | 252/70 |
| 3,986,969 | 10/1976 | Telkes | 252/70 |
| 4,109,702 | 8/1978 | Greene | 252/70 |
| 4,209,312 | 6/1980 | Herrick | 252/71 |
| 4,209,413 | 6/1980 | Kent et al. | 252/70 |
| 4,268,405 | 5/1981 | Herrick et al. | 252/70 |

FOREIGN PATENT DOCUMENTS 11411  5/1980  European Pat. Off.

OTHER PUBLICATIONS

Zambrzhitskaya et al., Khimicheskie Volokna, No. 3, pp. 65–68, May–Jun. 1978, Translation.

Primary Examiner—John E. Kittle
Assistant Examiner—Hoa Van Le
Attorney, Agent, or Firm—Dean R. Rexford

[57] ABSTRACT

Degradation of heat storage capacity in Glauber's salt heat storage compositions on thermal cycling is substantially decreased by addition of small amounts of crystal habit modifiers.

17 Claims, 2 Drawing Figures

○ Composition 1
(Sodium Polyacrylate)

△ Composition 2
(Sodium Hexametaphosphate)

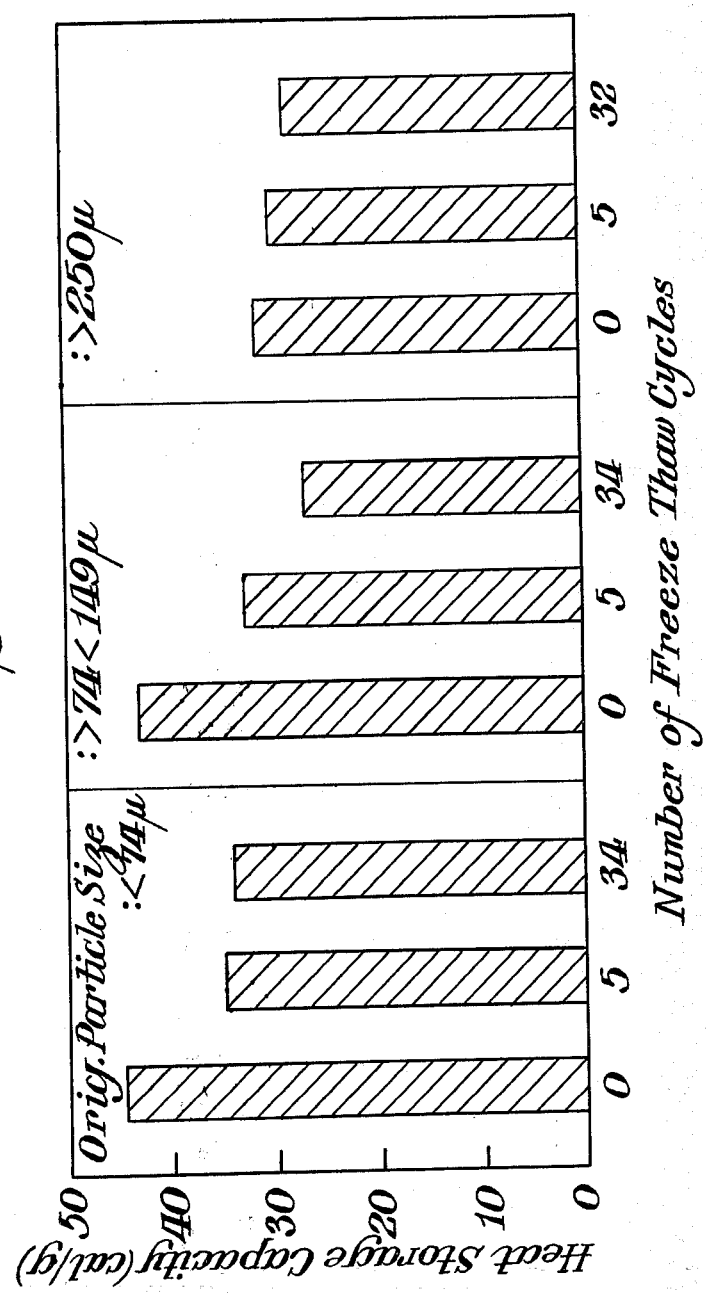

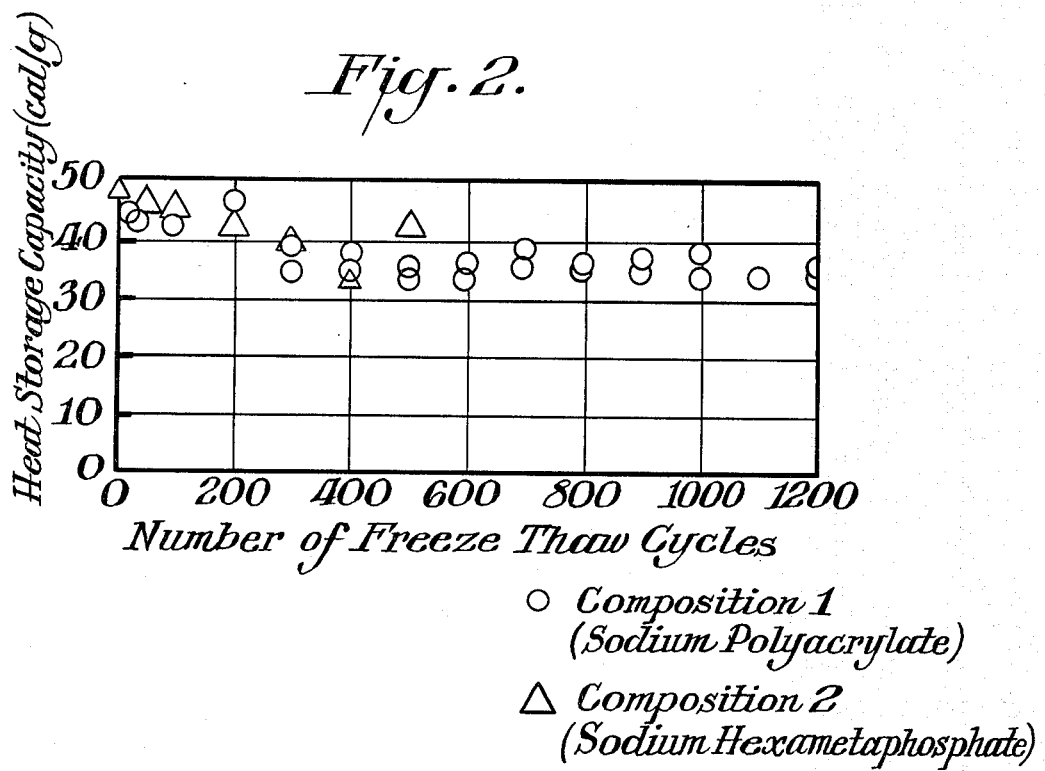

GLAUBER'S SALT HEAT STORAGE COMPOSITIONS, CRYSTAL HABIT MODIFIERS

BACKGROUND OF THE INVENTION

1. Field of the Invention

This invention pertains to an improved composition for the storage of heat as, for example, in the solar heating of buildings. More specifically the invention pertains to an improvement in heat storage systems which employ the heat of fusion of sodium sulfate decahydrate, whereby the capacity of the system to store heat is improved during a large number of freeze-thaw (thermal) cycles.

2. Description of the Prior Art

Sodium sulfate decahydrate, hereinafter called Glauber's salt has long been a candidate for the storage of sensible heat, particularly in the solar heating of houses. In addition to its cost and ready availability, the physical and chemical properties of the salt are especially attractive in this use: it has a convenient melting temperature of about 32° C. and a large heat-of-fusion of 50-60 cal/g. The melting temperature of Glauber's salt can be depressed to as low as 4° C. by the addition of suitable salts. Such low melting point mixtures have been suggested for the storage of "cold" to assist in air conditioning.

However, Glauber's salt melts incongruently, spontaneously nucleates the undesired heptahydrate, and severely undercools. The addition of small amounts of borax ($Na_2B_4O_7.10\ H_2O$), which is a nucleator for Glauber's salt, as disclosed by Telkes in U.S. Pat. No. 2,677,664, has solved the latter two problems.

However, the problems associated with incongruent melting are subtle and have not heretofore been completely solved. On melting, Glauber's salt forms $Na_2SO_4$ and water. The $Na_2SO_4$ does not completely dissolve in the released water of crystallization. Consequently about 15% of the solid Glauber's salt precipitates as $Na_2SO_4$ which, being more dense than the solution, settles to the bottom of the container. In the absence of deliberate homogenization, lowering the temperature below the melting point of Glauber's salt results in the formation of a metastable condition wherein the undissolved $Na_2SO_4$ coexists with newly formed Glauber's salt and excess solution.

For the purpose of storing thermal energy, this metastable condition is undesirable since the system's energy storage capacity is determined by the amount of Glauber's salt formed. Thus, when a melt of pure Glauber's salt is cooled below its melting point, not all of the potentially available salt is reformed in a practical time. Reestablishment of the single phase of Glauber's salt is retarded as the newly formed Glauber's salt crystallizes on top of the layer of $Na_2SO_4$ thereby impeding the desired recombination of $Na_2SO_4$ and the water of the solution.

Telkes, in U.S. Pat. No. 3,986,969, suggested the addition of attapulgite clay, which forms a thixotropic solution, to suspend the $Na_2SO_4$ in the melt. Other thickeners have also been proposed. For example, Kent et al in European Patent Application No. 0 011 411 proposed the use of covalently cross-linked sodium polycarboxylates, among other materials. Such means, although useful, have provided only partial solutions to the problem. Solution of the problem is particularly difficult because heat storage compositions, in practical use, must undergo many hundreds of freeze-thaw cycles without excessive degradation in heat storage capacity.

SUMMARY OF THE INVENTION

It has now been found that degradation of heat storage capacity on thermal cycling of Glauber's salt heat storage compositions can be substantially decreased by employing means to prevent crystals of sodium sulfate and Glauber's salt from growing to large size, such means comprise the addition of small amounts of crystal habit modifiers. Useful crystal habit modifiers can, for example, be selected from uncrosslinked alkali metal polycarboxylates, sodium hexametaphosphate, and surface active agents of the classes of ethoxylated amines and polyethylene oxide.

BRIEF DESCRIPTION OF THE DRAWINGS

FIG. 1 is a three-part graph relating sodium sulfate original particle size and number of freeze-thaw cycles to heat storage capacity. Compositions are outside the invention.

FIG. 2 is a graph relating heat capacity to number of thermal cycles in two compositions of the invention.

DESCRIPTION OF THE PREFERRED EMBODIMENTS

I have discovered that Glauber's salt heat storage systems having small crystals store more heat than do the same systems having larger crystals. Unfortunately, this desirable property is not retained by the small-crystal systems during repeated freeze-thaw cycling, as occurs in practical use. Indeed, the heat storage capacity of systems initially containing small crystals, say of a size to pass about 150 micron mesh, loses about 25% of its original heat storage capacity after only about 30 cycles, due to the formation of larger crystals.

I have now found that Glauber's salt compositions retain a large part of their heat storage capacity during extended thermal cycling so long as the crystal sizes of the sodium sulfate and Glauber's salt remain small. This desirable result is realized by employing appropriate crystal habit modifiers. Although I have demonstrated the invention with uncrosslinked sodium polyacrylate and sodium hexametaphosphate additives, I believe that many other materials which operate as crystal habit modifiers, would be operable, for example, alkali metal polycarboxylates generally and surface active agents such as those of the classes of ethoxylated amines and polyethylene oxide.

It is, of course, understood that surface active agents which are active in water solutions are meant. Thus, for example, polyethylene oxides of very high molecular weight would be inoperable because of their severly limited solubility.

It is critical to employ thickeners in the invention compositions. Mixtures comprising attapulgite clay thickener as suggested by Telkes supra are preferred. In such mixtures only slightly diminished heat capacity through at least fifteen hundred freeze-thaw cycles is achieved. It is expected that this invention will have application in all Glauber's salt systems including those for storing "cold" as described supra.

Crystal habit modifiers are known in the art. Perry et al list a number of them in Chemical Engineer's Handbook, McGraw Hill Book Company, New York, N.Y., p. 17-21 (1973).

The additives of this invention are well known and are generally available. Uncrosslinked polyacrylate salts, which, unlike crosslinked polycarboxylate salts, are freely soluble in water, have been recommended as antiscalants for use in industrial water systems where it is thought to modify the crystal habit of calcium sulfate. Nonionic comonomers such as acrylamide are not deleterious and such combinations are intended to be included in the definition of operable species. Such a product is sold by American Cyanamid Company, Wayne, N.J. under the trade name "Cyquest 3223" Antiscalant.

Suitable polycarboxylates also include alkali metal and ammonium salts of uncrosslinked polymers and copolymers having carboxylic acid-containing repeating units such as those derived from methacrylic acid, maleic and fumaric acid, and itaconic acid.

Sodium hexametaphosphate is not known as a crystal habit modifier; it is often employed as a so-called "builder" in commercial detergent mixtures and is an article of commerce.

Surface active agents of the classes of ethoxylated amines and polyethylene oxide are well known articles of commerce and are reported to operate as crystal habit modifiers in the crystallization of Glauber's salt in viscose precipitation liquors by Zambrzhitskaya et al in Khimicheskie Volokna, No. 3 pp. 65–68, May–June, 1978.

The concentrations of the additives of this invention in Glauber's salt heat storage compositions are not critical. In general, it is preferred to use only as much as is needed to achieve the invention effect because of cost and because such materials dilute the high heat storage capacity of the Glauber's salt. In general, in preferred compositions, about 1 wt. % of sodium polycarylate is added to the attapulgite clay mixtures of Telkes which have about the following compositions:

|  | Parts by Wt. |
|---|---|
| Attapulgite clay | 7–10 |
| Borax | 2–6 |
| Sodium sulfate | 18–21 |
| Water | 23–33 |

Somewhat less sodium hexametaphosphate, the next most preferred additive, can be employed, say as little as 0.005 wt % to about 0.5%. It is preferred to employ about 0.04 wt. %. Although the practice is without particular advantage, the invention additives can be employed in mixture with each other. The invention additives are operable in the presence of both borax and attapulgite clay, and such mixtures are most preferred. Optimum concentrations of any additive are readily determined by simple experiment.

Heat storage compositions of this invention are prepared by simple mixing of the ingredients. It is convenient to dissolve the additives of the invention in an amount of about 38° C. water corresponding to about ten moles for each mole of sodium sulfate to be used. To the water solution is added attapulgite clay and finely divided borax, if used, in the amounts recommended by Telkes. Finally, sodium sulfate is added to the stirred mixture to produce a homogenous mixture, which, if attapulgite clay is used, is thixotropic.

The invention additives are also advantageously operable in clay-free mixtures comprising the covalently crosslinked sodium polycarboxylate thickeners of Kent et al supra. Such combinations are not preferred, however, because of cost.

EXAMPLE 1

This example demonstrates the transient strong dependence of heat storage capacity on the original crystal size of the sodium sulfate employed to prepare the heat storage composition.

Sodium sulfate was ground and separated by sieving into portions having the following size distributions: <74, >74, <149, and >250 microns. Test mixtures were prepared from the portions by mixing the components, as described above, in the following proportions:

|  | Wt. % |
|---|---|
| Attapulgite clay* | 9.3 |
| Borax ($Na_2B_4O_7.10\ H_2O$) | 2.6 |
| Water | 49.3 |
| Sodium sulfate (sieved) | 38.8 |

*Purchased from Floridin Co., Berkley Springs, W. Va. under the trade name "Min-U-Gel"

The heat storage capacity was measured calorimetrically from time to time following up to 34 freeze-thaw cycles wherein samples, weighing about 150 g and enclosed in plastic containers, were cooled to 27° C. and warmed to 38° C. in eight hour cycles.

Heat storage capacity was measured in this and subsequent examples by calorimetry carried out as follows. After equilibration to ±0.1° C. at a temperature below the freezing point, samples were transferred to the water bath of a calibrated calorimeter equilibrated at a temperature above the melting point of the test sample. When the temperature of the calorimeter water had reached a constant value (less than 0.01° C./min. change), the temperature of the calorimeter water was noted and stored heat was calculated in the usual manner. The estimated experimental error was ±5%. The contribution of the sensible heat of the clay and the borax, amounting to a possible error of about 1%, was ignored.

Calorimetry results are shown in FIG. 1. The figure demonstrates that the initial (i.e. zero cycle) heat storage capacity is strongly dependent on the original particle size of the anhydrous sodium sulfate and that the capacities of samples of all original crystal sizes degrade, after some 32–34 cycles, to 25–30 cal/g. Published values for the heat of fusion of Glauber's salt would predict that the test mixtures would store about 50–55 cal/g.

EXAMPLE 2

This example demonstrates the efficacy of additives of the invention in preventing degradation of heat storage capacity in Glauber's salt systems on thermal cycling.

Test mixtures having the following compositions were prepared as described in Example 1:

|  | (Parts by Wt.) | |
|---|---|---|
|  | Composition 1 | Composition 2 |
| Attapulgite clay | 9.3 | 9.4 |
| Borax | 2.6 | 2.6 |
| Water | 48.9 | 49.3 |
| Sodium sulfate | 38.4 | 38.7 |
| Ammonium polyacrylate | 0.9 | — |
| Sodium hexametaphosphate | — | 0.04 |

The test mixtures were thermally cycled and calorimetrically tested as before. The results are shown graphically in FIG. 2. Examination of the figure shows that the heat capacity of both compositions declined slightly during the first several hundred cycles and remained essentially constant thereafter between about 32 and 42 cal/g. Examination of the test mixtures on completion of the experiment showed that sodium sulfate and Glauber's salt crystals had remained small.

For comparison with the above results, the heat storage capacities of similar mixtures, not containing the invention additives, i.e. those falling within the disclosures of Telkes, U.S. Pat. No. 3,986,969, were found to level at about 25 cal/g after about 300 cycles. Glauber's salt containing only borax, levelled at about 15 cal/g after 25 cycles. Large crystals were observed in both cases.

EXAMPLE 3

In other tests, a crosslinked sodium polycarboxylate ("Carbopol 941" sold by B. F. Goodrich Co., Akron, Ohio) disclosed by Kent et al supra as a thickener, was employed at 2.2 wt. % concentration in place of clay. In combination with the invention additives of compositions 1 and 2, heat capacity, levelled at about 45 cal/g in systems having theoretical heat storage values of 54–57 cal/g.

What is claimed is:

1. In a Glauber's salt heat-of-fusion heat storage composition, the improvement comprising the addition of an amount of crystal habit modifier effective to limit crystal size, whereby degradation of heat storage capacity of the composition during thermal cycling is decreased, wherein the crystal habit modifier is selected from sodium hexametaphosphate, alkali metal or ammonium uncrosslinked polycarboxylates and surface active agents.

2. The composition of claim 1 wherein the crystal habit modifier is a surface active agent selected from polyethylene oxides and ethoxylated amines.

3. The composition of claim 1 wherein the crystal habit modifier is sodium hexametaphosphate.

4. The composition of claim 1 thickened with attapulgite clay.

5. The composition of claim 1 further containing borax.

6. The composition of claim 1 thickened with covalently crosslinked alkali metal polycarboxylate.

7. The composition of claim 1 wherein the crystal habit modifier is an alkali metal uncrosslinked polycarboxylate.

8. The composition of claim 1 wherein the crystal habit modifier is an ammonium uncrosslinked polycarboxylate.

9. The composition of claim 1 wherein the amount of crystal habit modifier is effective to limit crystal size to 150 microns.

10. A heat storage composition consisting essentially of:

|  | Parts by Weight |
| --- | --- |
| Attapulgite clay | 7–10 |
| Borax | 2–6 |
| Sodium sulfate | 18–21 |
| Water | 23–33 | in admixture with one or more crystal habit modifiers selected from sodium hexametaphosphate, alkali metal or ammonium uncrosslinked polycarboxylates, and surface active agents.

11. A heat storage composition according to claim 10 wherein the crystal habit modifier is sodium hexametaphosphate.

12. A heat storage composition according to claim 10 wherein the crystal habit modifier is an uncrosslinked alkali metal or ammonium polyacrylate.

13. A heat storage composition according to claim 10 wherein the crystal habit modifier is uncrosslinked sodium polyacrylate.

14. A heat storage composition according to claim 10 wherein the crystal habit modifier is a surface active agent selected from polyethyleneoxides.

15. A heat storage composition according to claim 10 wherein the crystal habit modifier is a surface active agent selected from ethoxylated amines.

16. A heat storage composition consisting essentially of:

|  | Parts by Wt. |
| --- | --- |
| Attapulgite clay | 9.3 |
| Borax | 2.6 |
| Water | 48.9 |
| Sodium sulfate | 38.4 |
| Ammonium polyacrylate | 0.9 |

17. A heat storage composition consisting essentially of:

|  | Parts by Wt. |
| --- | --- |
| Attapulgite clay | 9.4 |
| Borax | 2.6 |
| Water | 49.3 |
| Sodium sulfate | 38.7 |
| Sodium hexametaphosphate | 0.04 |

* * * * *